United States Patent [19]
Johnston

[11] Patent Number: 4,901,671
[45] Date of Patent: Feb. 20, 1990

[54] SYNTHETIC CHICKEN LITTER AND METHOD OF USING

[76] Inventor: Charles Johnston, 1690 Arthur Dr., Wooster, Ohio 44691

[21] Appl. No.: 182,359

[22] Filed: Apr. 18, 1988

[51] Int. Cl.⁴ .......................................... A01K 215/00
[52] U.S. Cl. ........................................ 119/1; 106/316
[58] Field of Search ............................................ 119/1

[56] References Cited

U.S. PATENT DOCUMENTS

| | | |
|---|---|---|
| 734,619 | 7/1903 | Scott . |
| 2,565,521 | 8/1951 | Ratermann . |
| 3,726,255 | 4/1973 | Marr . |
| 3,771,495 | 11/1973 | Johnston . |
| 3,809,013 | 5/1974 | Rigney et al. ............... 119/1 |
| 3,828,731 | 8/1974 | White ............................ 119/1 |
| 4,017,653 | 4/1977 | Gross ......................... 128/156 |
| 4,020,156 | 4/1977 | Murray et al. ................ 119/1 |
| 4,190,525 | 2/1980 | Menzel ......................... 119/1 |
| 4,205,624 | 6/1980 | Yacus ........................... 119/1 |
| 4,471,717 | 9/1984 | Lander ......................... 119/1 |
| 4,536,454 | 8/1985 | Haasl . |
| 4,593,645 | 6/1986 | Dingler ........................ 119/1 |

Primary Examiner—Richard J. Apley
Assistant Examiner—N. Paul
Attorney, Agent, or Firm—Sidney W. Millard

[57] ABSTRACT

Synthetic chicken litter of foamed polymer is coated with a tough polymeric coating which cannot be pecked off by chickens. The litter is distributed on the floor of a chicken pen to prevent direct contact between the floor and the chicken. The depth of the litter on the floor will be from about one to about twelve centimeters.

11 Claims, 1 Drawing Sheet

U.S. Patent      Feb. 20, 1990      4,901,671
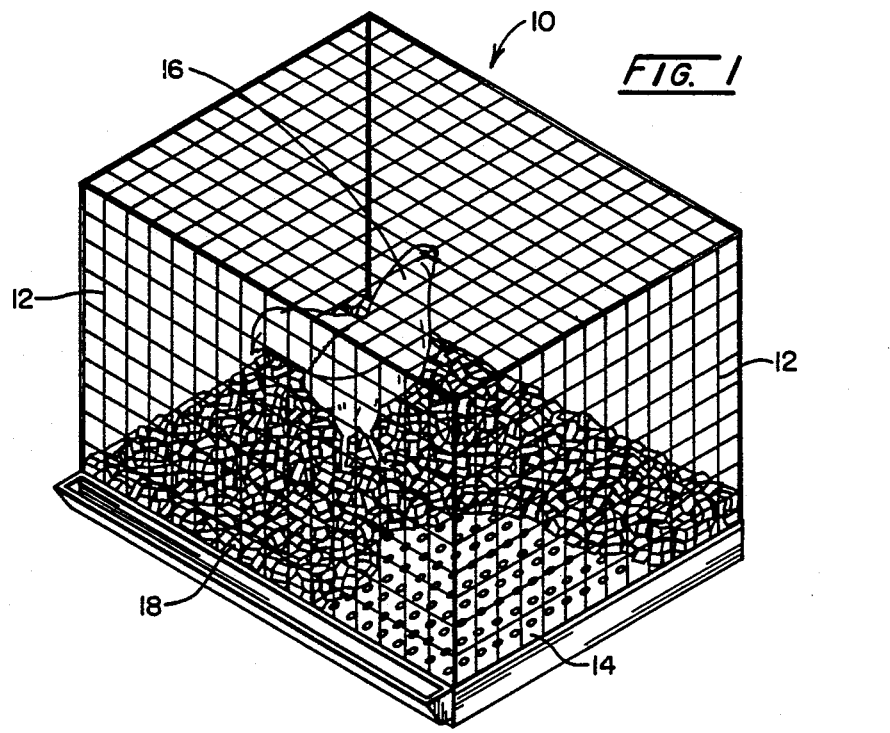
FIG. 1
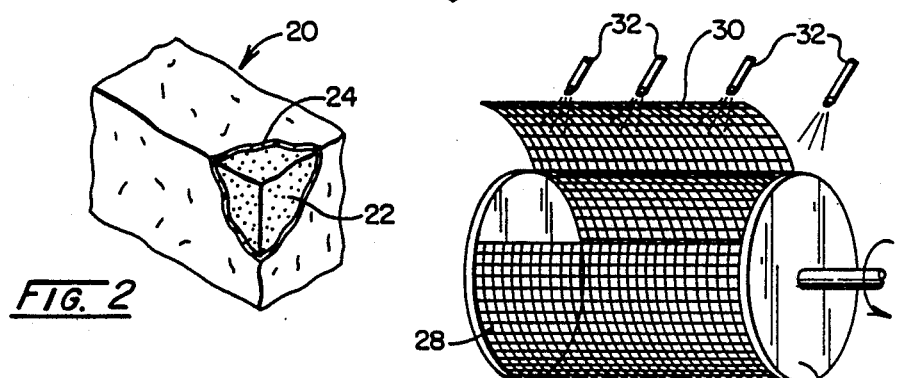
FIG. 2
FIG. 3
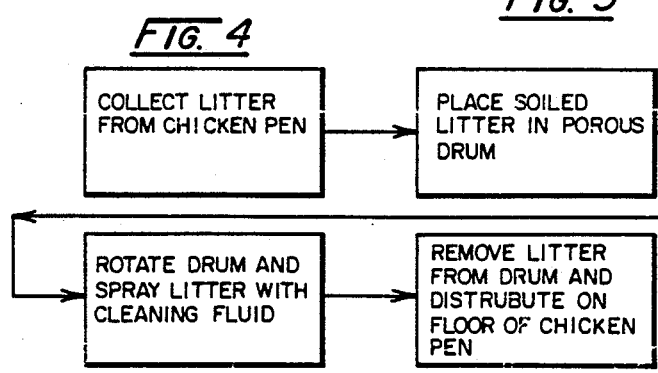
FIG. 4

SYNTHETIC CHICKEN LITTER AND METHOD OF USING

FIELD OF THE INVENTION

This invention relates to synthetic reusable chicken litter and methods of using the same.

BACKGROUND OF THE INVENTION

Virtually all of the ten billion broiler chickens which are currently produced annually in the United States are raised from one day of age until ready for processing in confined houses under conditions which will assure that the quality of the resulting carcass is as free as possible from defects or blemishes. The presence of abnormalities can result in parts or all of the affected carcass being down graded or condemned as being unfit for human consumption which results in substantial losses both to the poultry producer and the consumer.

In raising poultry such as chickens from brooder chick size to broiler size, which normally requires a growing period of about six to ten weeks, the birds must be protected and raised under conditions which will prevent them from injuring themselves so as to degrade their appearance and hence lower their quality. The higher the quality, the higher the price to the grower.

In the latter part of the growing cycle, the birds develop rapidly and gain considerable weight. During this period the birds spend a considerable amount of time resting on their breasts rather than standing in an upright position. If the support surface under the birds is hard, such as a wire support base in a cage or a floor with no cushioning material such as wood shavings or sawdust, considerable wear is imparted to the breasts of the birds during their normal activities. This wear to the breasts will quickly irritate the bursa of the sternum and eventually result in the development of large fluid containing blisters.

While poultry growers have long recognized this problem and the disastrous results in terms of the birds being down graded or condemned, an effective and inexpensive solution to their problem does not presently exist in the art of poultry growing. Growers have long appreciated that poultry cannot be raised successfully to maturity in cages on a commercial scale because of the inability to provide a support which will not produce deformities in the birds. In order to circumvent this problem, poultry are usually raised in large brooder pens which utilize wood shavings or sawdust or a similar type of material as a support. While this approach has been reasonably effective for rearing poultry in brooder pens, regular refurbishment of the support material is required because the birds eat and/or compact the material such that a hard surface crust will form. The support material must then be cultivated or otherwise broken up or new material added to avoid the deleterious results of the hard surface crust. Moreover, as the poultry droppings accumulate in the support material, in a comparatively short time it will have to be replaced. Of course, sawdust-type of support is satisfactory only in brooder pens and is not practical for use in cages.

One of the earlier designs for commercial raising of chickens is shown in the patent to Scott, Patent No. 734,619. No particular discussion of the chicken support or litter problem is included but several of the problems inherent in raising chickens are discussed. The patent describes the general overall environment for raising poultry.

Moving forward fifty years, the patent to Ratermann, U.S. Pat. No. 2,565,521, describes a stacked series of chicken pens designed to house laying chickens. The cage is completely of wire screen and there is no concern whatsoever for raising a chicken for meat quality. The chicken droppings fall through the screen mesh onto a conveyor belt, with one conveyor belt being located below each level of chicken cages. In modern egg farms there is no conveyor belt for each layer of pens but otherwise the system is not greatly changed in general concept.

The patent to Marr, U.S. Pat. No. 3,726,255, recognizes the problem of breast blisters and the like in conventional cages and has attempted to solve the problem by a unitary resilient mat disposed on the floor of a standard cage. This prevents the bird from direct contact with the hard surface of the floor. Chicken droppings, feathers, etc. are intended to fall through the apertures in the resilient mat. To be effective this unitary mat must have its apertures in vertical register with similar apertures in the floor of the cage, otherwise the droppings will tend to collect in blocked apertures. There is still the problem that droppings will not necessarily fall in an aperture and after a period of time it will be necessary to clean the cage to remove the droppings from the horizontal surfaces of the mat.

A second patent recognizing the problem of blisters on the keel bursa of the poultry is in the patent to Stevenson and Johnston (Johnston being the inventor of this invention), U.S. Pat. No. 3,771,495. Again the solution suggested by the patent is to use a resilient unit to rest on the floor of the pen and again there are apertures in the resilient member designed to be in register with apertures in the hard floor. The same problem exist in disposing of the animal feces and its unintended collection on the horizontal surface of the resilient covering of the floor.

SUMMARY OF THE INVENTION

According to this invention, poultry can be confined and successfully grown in both large brooder pens or in cages under conditions which will substantially reduce and in many cases eliminate blisters on the keel bursa of poultry. The support material imparting the properties needed to reduce or eliminate blisters on the keel bursa is a synthetic litter which consists of pieces of polymeric foam which are covered with an impervious coating which will render the foam virtually indestructible by the poultry from their pecking, walking, sitting or scratching actions. At the same time, the synthetic litter remains impervious and undamaged by the excretions of the poultry and the environment of the poultry house.

Examples of foam which have been found to meet the criteria necessary for this invention include 2.2 pounds per cubic foot polyethylene foam or 2.0 to 4.0 pound per cubic foot crosslinked polyethylene foam, all coated with a thermoplastic rubber or polyurethane. While the dimensions of the individual units making up the synthetic poultry litter are important, they will very depending upon whether it is used in a large brooder pen on the ground or in cages having openings in the floor through which the droppings must pass.

Advantages to the poultry industry owner who may use synthetic litter as described herein include:
1. reduced incidence of carcass defects such as breast blisters;

2. litter is permanent and need not be replaced;
3. maintenance of litter conditions necessary to assure the production of the highest quality of broiler is greatly simplified;
4. poultry waste is not contaminated with undesirable materials such as sawdust or shavings thereby making it more valuable as a product for other uses;
5. poultry are reared under more sanitary conditions; and
6. reduced costs of production.

In addition, the use of synthetic poultry litter offers a greatly simplified and therefore potentially advantageous procedure for cage rearing of broiler chickens. These advantages include:
1. no requirement for registering the floor with a support frame to permit the passage of excretion through the cage floor;
2. more efficient use of foam for manufacturing the protective floor since there will be no waste from the hole area;
3. simplified manufacturing procedures for both the protective foam and cage will be possible which should result in lower cost; and
4. easier cleaning of the cage between growing cycles.

Objects of the invention not understood from the above will be clear from a review of the drawings and the description of the preferred embodiments which follow.

BRIEF DESCRIPTION OF THE DRAWINGS

FIG. 1 is a perspective view of a chicken in a cage standing on litter according to this invention;

FIG. 2 is a perspective view partially in section of a single piece of the litter of the FIG. 1 to show the coating and foamed interior:

FIG. 3 is a perspective view of a cleaning apparatus for cleaning soiled litter; and FIG. 4 is a block flow diagram showing the sequence for collection, cleaning and replacing chicken litter in a chicken pen.

DESCRIPTION OF THE PREFERRED EMBODIMENT

In the general operation of a chicken farm one must be concerned with the ability of the chickens to destroy equipment by virtue of their natural tendency to peck and scratch at everything in sight. Therefore, in the attempt to design synthetic chicken litter the continuing problem was and is to have a product which cannot be destroyed by pecking, scratching and walking chickens and products which will not be injured by dropping from ten feet or so.

During experiments by the inventor several attempts were made to design chicken litter of a suitable nature and it was only after the inventor became aware of the coating product and system described in the patent to Haasl, U.S. Pat. No. 4,536,454, that a suitable product was achieved. Foamed polyethylene having a density of about 2.2 pounds per cubic foot or crosslinked polyethylene having a density in the range 2.0 to 4.0 pounds per cubic foot was formed into various sizes and geometric shapes and the various shapes were coated in the two coat process described by Haasl.

First a primer coat including about 30% thermoplastic resin of methylmethacrylate copolymer, about 67.45% solvent (1,1,1-trichloroethane), about 2.25% silicon dioxide filler and about 0.30% thermoplastic rubber (consisting of styrene/ethylene/butylene/styrene block copolymer). After the primer coat was applied then a surface coat was applied consisting of a thermoplastic rubber consisting of about 13.86% styrene/ethylene/butylene/styrene block copolymer, about 1.49% silicon dioxide filler, about 3.84% calcium carbonate and about 74.69% of a solvent consisting of a mixture of 50/19/7 of 1,1,1-trichloroethane, VMP Naptha and methylene chloride together with an antioxidant and ultraviolet absorbing components.

The above chemical compositions and mixtures are merely an example of one coating. A plurality of different coating of the general type are described in the aforementioned Haasl patent and any of the coatings described therein are suitable for coating the foamed resin used in this invention. To the extent necessary for a full understanding of this invention the Hassl patent disclosure is incorporated herein by reference. In experimental use it has been found that the primer coat is unnecessary for most chicken litter uses, the surface coat performs satisfactorily for normal operations.

Looking now to FIG. 1, a chicken pen 10 includes wire walls 12 and a floor 14 which may be wire such as the wire walls 12, it may be a hard or flexible surface with a plurality of apertures therein or it may be a solid wooden or earth or flexible floor, depending totally upon the desires of the user.

Within the chicken pen is a chicken 16 standing on the artificial litter 18 of this invention. The litter itself is composed of a plurality of discrete units, one of which is illustrated in FIG. 2.

The individual unit 20 in FIG. 2 is of some unspecified geometric shape of foamed polyethylene 22 covered by an impervious coating 24.

The chemical composition of the unit 20 including its coating is described above and will not be repeated here but the coating does have a number of very important physical characteristics which are required for use in the environment of a chicken pen. The coating must remain soft and pliable at ambient temperatures but not so soft that the coating can be separated from the foamed base by scratching or pecking of chickens. Additionally, it must be sufficiently adhesively bonded that it will not chip or peel upon being dropped several feet such as might occur in the normal distributing of the litter on the floor of a chicken pen or in the cleaning process for the artificial litter as will be described subsequently. Additionally, the coating must have the capacity to slough chicken droppings, liquids, food and the like to prevent these undesirable elements from collecting on the surface of the individual units 20 while the chickens are growing to their maturity and performing their natural functions in the cage. It is also clear that the coating must not be chemically reactive with the chicken droppings, otherwise they would quickly deteriorate and become useless.

Discussing now the geometric shape of the units 20, there is no particular shape which is preferable but generally it is desirable to have some sort of geometric shape without designing in any concave surfaces which might inherently collect chicken droppings should the units 20 be oriented in the wrong direction. That is not to say that certain small indentations will not exist in the coated unit due to the inherent bubble nature of the foamed product. However, such indentations are small in magnitude and will not collect much of a volume of droppings, if any at all. The unit 20 could be square or rectangular in cross-section, it could be round, it could be polygonal, it could be much longer than the crosssectional dimensions. In any case, the individual units of the litter will have a length and a thickness and the length may be in the range of one-half centimeter to one hundred centimeters. The depth being defined as the longest dimension of the unit transverse to the length should be in the range of about one-half centimeter to about four centimeters. Preferably the units are of elongated rectangular shape and should have a length of about twelve centimeters and a width and height of about one or one and one-half centimeters.

Looking again to FIG. 1, the depth of the litter on the floor is important because it is undesirable for the chicken to come into contact with the hard floor 14, therefore, it is desirable that the floor be completely covered with the litter to a depth of from about one-half centimeter to about twelve centimeters with the preferred depth being from about one centimeter to about six centimeters. With these preferred depths it is a rare situation that a growing chicken would ever come into any direct contact with the floor 14 either by its scratching, walking or the like. The illustration of FIG. 1 shows floor 14 as exposed but this is merely to illustrate the structure underlying the layer of litter. Ordinarily no floor surface will be exposed. The natural tendency of chickens to walk around on the artificial litter, scratch, rub, etc. will tend to have a beneficial affect in causing the droppings and other foreign matter to slough off from the surface of the litter and work its way to the bottom and be completely out of contact with the chicken. Should the floor have openings to allow the discharge of droppings by gravity then the resulting droppings will be more pure in content than those of the conventional chicken houses which include wood shavings, sawdust and the like mixed therein.

The size of the individual units of the chicken litter is important at various stages of the growing cycle. Since chickens in the environment described will range in age from one day to ten weeks it is critical that the litter not be so large as to discourage or hide the small chick from its contemporaries and thereby perhaps prevent it from finding food and water which are normally located around the periphery of the chicken pen.

The chicken cage in FIG. 1 is for illustration only. In operation the cage may be much larger or the litter could rest on bare ground and the pen could be an acre or more in size. Looking now to FIGS. 3 and 4, at some stage of the growing cycle it will be necessary to clean the chicken pen and in the process remove the artificial litter. This may not occur until a complete growing cycle has been completed but in any case at some stage something will have to be done to clean the litter. In this invention the litter is collected by manual or mechanical means and taken to a washing site, in this case it is illustrated as a rotating drum 26 having wire sides 28. The soiled litter is placed in the porous drum 26 through open door 30 and then the door is closed. A cleaning fluid is sprayed on the drum 26 from nozzles 32 as the drum rotates. The cleaning fluid in question may be water, water in combination with a detergent or some other fluid which is satisfactory under the circumstances. The combination of the cleaning fluid and the agitation of the rotating drum will dislodge any foreign matter from the individual pieces of litter and condition it for reuse.

The size of the openings between the wires forming the drum wall 28 will be dictated by the size of the discrete units of chicken litter. The size of the units of litter should be larger than the largest opening in the screen 28. After the cleaning process is completed the door 30 will be opened and the drum rotated such that the cleaned litter will be discharged by gravity through the open door as the rotation continues. The cleaned litter can then be collected and returned to the original or a different chicken pen where it will be distributed on the floor in the desirable thickness.

The showing of the rotating drum having a screen periphery is illustrative only. The cleaning process could consist of a flat wire screen with spray nozzles spraying from below or from above. There are probably other satisfactory cleaning designs which would be equally satisfactory. The particular design is only one possible alternative.

The cleaned litter may or may not be dried before it is redistributed on the floor of a chicken pen. Since the surface coating is liquid and air impervious it would certainly not need a long drying period in any case.

Having thus described the invention in its preferred embodiment it will be clear that modifications may be made to the invention without departing from the spirit thereof. The words used to describe the invention and the drawings used to illustrate the same are not intended to be limiting on the invention rather it is the inventor's intent that the invention be limited only by the scope of the appended claims which follow.

I claim:

1. In the combination of an enclosure for raising chickens or the like, said enclosure having a floor and litter on said floor, said litter including a plurality of discrete units distributed over said floor and of a depth to substantially prevent direct physical contact between any chicken in said enclosure and said floor, each of said units being of a foamed polymer coated with a polymeric material, said polymeric coating material having the physical characteristics of (1) remaining pliable at ambient temperatures, (2) being bonded to said foamed polymer with such strength that it will not separate from said foamed polymer upon impact after being dropped several feet, (3) being bonded to said foamed polymer with such strength that it will not separate from said foamed polymer by walking, pecking or scratching by chickens, (4) sloughing chicken droppings to thereby cause said droppings to move to the floor rather than remain on the surface of the litter, (5) being impervious to air and water, and (6) being chemically non-reactive with chicken droppings.

2. The combination of claim 1 wherein said units have a peripheral surface substantially without concavities and having a large dimension not greater than about one hundred centimeters nor less than about one-half centimeter.

3. The combination of claim 2 wherein said units comprise an elongated geometric shape, said shape having a thickness dimension in the range of about one-half to four centimeters and a length dimension not greater than about twelve centimeters.

4. The combination of claim 3 wherein the thickness dimension is in the range of about one to one-half centimeters.

5. The combination of claim 4 wherein the depth of said litter on said floor is not substantially greater than about twelve centimeters nor substantially less than about one-half centimeter.

6. The combination of claim 1 wherein the depth of said litter on said floor is not substantially greater than about twelve centimeters nor substantially less than about one centimeter.

7. The combination of claim 2 wherein the depth of said litter on said floor is not substantially greater than about twelve centimeters nor substantially less than about one centimeter.

8. Synthetic chicken litter comprising discrete units of foamed polymer coated with a polymeric material, said polymeric coating material having the physical characteristics of (1) remaining pliable at ambient temperatures, (2) bonded to said foamed polymer with such strength that it will not separate from said foamed polymer upon impact after being dropped ,several feet, (3) being bonded to said foamed polymer with such strength that it will not separate from said foamed polymer by walking, pecking or scratching by chickens, (4) sloughing chicken droppings to thereby cause said droppings to move to the floor rather than remain on the surface of the litter, (5) being impervious to air and water, and (6) being chemically non-reactive with chicken droppings.

9. The litter of claim 8 wherein the coating on the foamed polymer includes (1) a base coat of methylmethacrylate copolymer, solvents and filler material and (2) a top coat of thermoplastic rubber, solvents and fillers.

10. The litter of claim 9 wherein the foamed polymer comprises polyethylene having a density in the range of about two to about four pounds per cubic foot.

11. The litter of claim 8 wherein the foamed polymer comprises polyethylene having a density in the range of about two to about four pounds per cubic foot.

* * * * *